United States Patent
Sano et al.

(10) Patent No.: US 11,354,476 B2
(45) Date of Patent: Jun. 7, 2022

(54) SIMULATION METHOD OF AN ELECTRON DEVICE

(71) Applicant: Hiroshi Watanabe, Kanagawa (JP)

(72) Inventors: Nobuyuki Sano, Ibaraki-ken (JP); Hiroshi Watanabe, Kanagawa-ken (JP); Chih-Wei Yao, Changhua County (TW)

(73) Assignee: Hiroshi Watanabe, Kanagawa-ken (JP)

( * ) Notice: Subject to any disclaimer, the term of this patent is extended or adjusted under 35 U.S.C. 154(b) by 286 days.

(21) Appl. No.: 16/682,187

(22) Filed: Nov. 13, 2019

(65) Prior Publication Data

US 2020/0159881 A1    May 21, 2020

(30) Foreign Application Priority Data

Nov. 15, 2018   (JP) .............................. JP2018-214245

(51) Int. Cl.
*G06F 17/10* (2006.01)
*G06F 30/367* (2020.01)
*G06F 111/08* (2020.01)

(52) U.S. Cl.
CPC ........ *G06F 30/367* (2020.01); *G06F 2111/08* (2020.01)

(58) Field of Classification Search
CPC ............... G06F 30/367; G06F 2111/08; G06F 2119/08; G06F 30/23; G06F 2111/10
See application file for complete search history.

(56) References Cited

U.S. PATENT DOCUMENTS

| 5,627,772 A * | 5/1997 | Sonoda .................... G06F 30/23 703/14 |
| 6,041,424 A * | 3/2000 | Kurata ..................... G06F 30/23 714/33 |
| 2020/0159881 A1* | 5/2020 | Sano ....................... G06F 30/367 |

OTHER PUBLICATIONS

Sverdlov et al. Current Transport Models for Nanoscale Semiconductor Devices Materials Science and Engineering R 58, 2008 pp. 228-270 (Year: 2008).*

(Continued)

*Primary Examiner* — Rehana Perveen
*Assistant Examiner* — Cuong V Luu
(74) *Attorney, Agent, or Firm* — Alan D. Kamrath; Karin L. Williams; Mayer & Williams PC

(57) ABSTRACT

There is a significant precaution when performing random dopant fluctuation by using the drift-diffusion model that is the basis of the conventional device simulation. Because the continuation by a long wavelength approximation was done to derive said drift-diffusion model. That is how to recover the location dependence of discrete impurity ions in the long wavelength approximation. For example, in the case that there is an impurity ion near to the interface to an insulating film, the charge density of an impurity ion, which was made continuous in the conventional method, is unable to catch the charge density change due to polarization at the interface. Because this polarization is dependent of the location of a discrete impurity ion near to the interface.

A method for simply implementing the effect of polarization to the device simulation is provided by appending an image charge inside the insulating film to linearize the charge of discrete impurity ion which locates near to the interface to satisfy the consistency to the drift-diffusion model while keeping the location dependency of the discrete ion.

7 Claims, 17 Drawing Sheets

(56) References Cited

OTHER PUBLICATIONS

Takaaki Tsunomura et al., Verification of Threshold Voltage Variation of Scaled Transistors with Ultralarge-Scale Device Matrix Array Test Element Group, Japanese Journal of Applied Physics. Dec. 21, 2009, 5 pages. vol 48—No. 12R, The Japan Society of Applied Physics, Japan and online.

Nobuyuki Sano, Physical Issues in Device Modeling: Length-Scale, Disorder, and Phase Interference, Institute of Applied Physics, University of Tsukuba, 2017, 4 pages, University of Tsukuba, Tsukuba, Ibaraki, Japan.

\* cited by examiner

SIMULATION METHOD OF AN ELECTRON DEVICE

CROSS REFERENCE TO RELATED APPLICATIONS

The application claims the benefit of Japanese application serial No. 2018214245, filed on Nov. 15, 2018, and the subject matter of which is incorporated herein by reference.

BACKGROUND OF THE INVENTION

1. Field of the Invention

The present invention generally relates to a device simulation method and, more particularly, to a method to reproduce random dopant fluctuation in the drift-diffusion model.

2. Description of the Related Art

Electron devices like transistors or memory cells, which play a central role of major cells in semiconductor chips, have been downscaled in size annually according to the device-scaling rule, in order to satisfy the Moore's law. The LSI manufacturing technologies, which mass-produce very small electron devices like these based on the lithography technology, are approaching the physical limitation of the miniaturization. This has caused the increase of the research and development expenses. To suppress this increase as much as possible, it is a significant technological issue to improve the reliability of the simulation of electron devices (device simulation).

In the history of the LSI industry, wherein integrated circuits are printed on a semiconductor surface, the root is the solid-state amplifier using a PN junction, that is, a MOSFET and so forth. Since then, significant studies of electron devices using an electrical property of PN junction have been made. The electrical property of a PN junction is reproduceable by the drift-diffusion model with an external potential applied to the PN junction as a boundary condition. The property of an integrated electron device may be simulated by combining the Poisson equation, wherein the charge density as well as the second derivatives of potential distribution inside the electron device, and the current continuity equations including the drift and diffusion terms in the drift-diffusion model. However, the current continuity equations and the drift-diffusion terms are necessary for both of conduction electrons (or electrons) and holes. Thereby, it is necessary to solve the three equations simultaneously. The number of independent variables is thus three of potential, electron density and hole density.

The electron device in a circuit is defined as somewhat to detect a predictable current output within an allowable range in response to a voltage input having an allowable error in a system design. On the other hand, to solve the Poisson equation is identical to a kind of boundary value problem in mathematics. Accordingly, the input of voltage applied to an electrode of an electron device into the Poisson equation as a boundary condition is identical to the input of the voltage to the electron device by ignoring allowable error in a system design. By solving this Poisson equation, the potential distribution inside the electron device can be obtained. By inputting the potential (or electric field which is its derivative) as well as electron density and hole density, which are distributed on spatial points inside the electron device, into the drift-diffusion terms, we can obtain the current densities on those points from given mobilities and diffusion constants. Then, we input these current densities to the current continuity equations. By integrating these in space, we can calculate the electric current value at the boundary surface on which said input voltage is applied.

However, electrons and holes may move progressively with time according to the drift-diffusion phenomena, which updates the charge distribution inside the election device. This may change the solution of the Poisson equation. We have to solve the simultaneous linear equations of the Poisson equation and the current continuity equations having the drift-diffusion terms while taking into account this update. This is the basic mechanism of the simulation of electron device (device simulation), wherein the drift-diffusion model plays a central role.

It is able to derive said device-scaling rule by assuming the drift-diffusion model (composing the simultaneous linear equation of the Poisson equation and the current continuity equations). For example, we require that the potential distribution inside an electron device is unchangeable (unchanging electric field) even though downsizing the electron device by 1/K in which K is the scaling factor (larger than the unity). Accordingly, the dimension of electron device and the applied voltages decreases with 1/K and the dopant concentration increases with K. Then, we can find that the current level decreases with 1/K and the circuit delay declines with 1/K. Thus, the performance of LSI improves totally. As a result, the power consumption of an electron device (a cell) decreases with the inverse of the square of K. Furthermore, if the manufacturing cost per wafer is a constant, the manufacturing cost per a cell substantially decreases since the number of cells (electron devices number) per chip area increases with the square of K. By doing this, according to the device-scaling rule, we can expect that the performance improvement and the cost-down per cell and the suppression of power consumption increase per chip are simultaneously realized.

In other words, all those advantages will change within a range of prediction while the drift-diffusion model is valid. The business merit is tremendous. However, this drift-diffusion model is approaching the limitation of validity as the miniaturization goes. If we will give up the drift-diffusion model, the developing model of the LSI industry will dissolve and then an industrial paradigm will change.

Here, we have two options. The one is that we build a developing model based on a new technology to get over this paradigm shift. The other is to prolong the lifetime of the electron devices based on the drift-diffusion model. However, to reduce the increase of the development cost, we need a highly reliable device simulation, as mentioned above.

The former relates to quantum transportation model or quantum computing. The present disclosure relates to the latter of the highly reliable device simulation. However, it is not preferable in the practical usage to consume an excess computational resource in order to improve the simulation reliability. Because the turnaround time (TAT) is important in developing an LSI chip product. The repetition number of executed simulations to develop a product is M while the simulation time per execution, that is, TAT, increases by X, in order to improve the reliability of the simulation. In this event, the developing duration increase by MX. If this MX is too big, we should proceed the development without the simulation. In other words, it does not make sense, unless reducing X is possible while improving the reliability of simulation.

Now, what is the highly reliable device simulation? To answer it, we should grab the factors to reduce the reliability of the device simulation by downsizing. The drift-diffusion model is somewhat invalidated by the downsizing which breaks the device-scaling rule essentially.

The random dopant fluctuation is one of significant problems to break the device-scaling rule. The drift-diffusion model is a kind of hydrodynamic simulation, from which the output is assumed to be a continuum. This is consistent to the above-mentioned definition of electron device. On the other hand, dopants doped on semiconductor surface to form a PN junction compose an aggregation of impurity ions that are discontinuous and are not inherently a continuum. In other words, in an electron device, impurity ions that are discontinuous embodiments are discretely distributed. This feature is inherently inconsistent to a continuum approximation, that is, the assumption of the drift-diffusion model.

To remove this inconsistency, it has been assumed that the impurity ions continuously distribute in the drift-diffusion model. In this assumption, the electric fields that conduction electrons and holes feel from impurity ions are re-defined as a continuous matter by the averaging.

In the level of a typical textbook, an aggregation of impurity ions continuously diffuses like a cloud according to the diffusion equation in forming a diffusion layer at high temperature. We have supposed that it leaves a diffusion layer of impurity ions, which distributes like a continuous cloud, on the substrate surface after cooling the semiconductor substrate. By this reason, in the drift-diffusion model, we input substitute ions that distributes continuously and electrons and holes that distribute continuously as well into the Poisson equation.

Incidentally, "diffusion" of the drift-diffusion model is the phenomenon that the carriers of conduction electrons and holes diffuse in semiconductor according to the diffusion equation. On the other hand, "diffusion" of the above-mentioned impurity ions is the phenomenon that the doped ions diffuse in semiconductor according to the diffusion equation as well. Both are the same diffusion phenomenon, but the former "diffusion" of carriers occurs at room temperature while the latter "diffusion" of impurity ions occurs in a semiconductor heated at high temperature.

The difference in occurring temperature is from that more active lattice vibration is necessary to diffuse heavier impurity ions. However, the semiconductor substrate is a single crystal of silicon and so forth. The lattice vibration is the vibration of lattice point of the crystal. Furthermore, assuming that the lattice vibration is elastic, the quantized lattice vibration turns out phonon (Field quantization). If these phonons scatter with carriers and impurity ions frequently and randomly, those carriers and impurity ions do the Brownian motion. The particles doing the Brownian motion (carriers at room temperature and impurity ions at a high temperature in this example) are Brownian particles. Because of collective motion of those Brownian particles, the diffusion phenomenon occurs. In general, the number of phonons increases, and the lattice vibration becomes more active, as temperature increase. This enhances the diffusion phenomenon.

The diffusion equation is an equation of continuum because it is in a differentiation form. Thus, the distribution of impurity ions becomes continuous to be the impurity ion concentration (or impurity concentration) and the spatial distribution of the charge of the impurity ions becomes an impurity charge density, which is continuous. The distributions of conduction electrons and holes, which are carriers, turns out electron density or hole density as well. Note that it is capable of defining the density and concentration in a continuous approximation. We can theorize this continuous approximation with the long wavelength approximation that we will explain as below.

The number of Brownian particles is necessary to be very large in order to assure the diffusion equation. The Brownian particles can change the location frequently and randomly by scattering with phonons frequently and randomly. Since this change in location has no regularity, the Brownian particles cannot stay at a specific location. Accordingly, even if collecting limitless number of Brownian particles at a point location, those Brownian particles will change their locations randomly. Thus, progressively with time, those locations become far from the initial point of location in average. This widens the distribution. If the number of Brownian particles is very huge, we can regard this distribution as continuous. Like this, we can find that the diffusion phenomenon is a collective motion of very huge number of Brownian motions. We renormalize the frequently limitlessly occurring phonon scattering that causes the diffusion phenomenon into the diffusion constant defined in the diffusion equation. Thus, the inherently discontinuous scattering events was converted to be continuous and then included in the diffusion equation.

From the viewpoint of the diffusion phenomenon, what is necessary for the continuous approximation is a very huge number of particles. However, the carrier density (electron density and hole density) and the impurity concentration cannot be limitlessly large. In a silicon semiconductor, it is at most 100 exa (i.e., ten to the power of 20) per cubic centimeter in average. If downsizing the semiconductor from the cubic centimeter to the cubic micrometer, it is 100 mega (ten to the power of 8) in average. Further if downsizing it to 10 nanometers' cubic, it is 100 in average. It is accordingly self-evident that it becomes difficult to have sufficient number of particles for the continuous approximation with the miniaturization. In terms of statistical mechanics, the deviation from the average (fluctuation) increases inverse-proportionally to the square root of the number of particles as the number of particles decreases. Contrary, as the number of particles increases limitlessly, the deviation from the average vanishes. Therefore, the continuous approximation is identical to the mean-field approximation. On contrary, the diffusion equation defined by renormalizing huge number of phonon scatterings to the diffusion constant is an equation of continuum derived by the mean-field approximation.

Another condition to validate the continuous approximation is the picture of long-range potential change that the electro-static potential varies smoothly through the electron device. In this picture, it is required that there are sufficient number of impurity ions within a volume wherethrough the potential changes by a given quantity even if the impurity ion concentration is limited. However, with the device scaling, the volume of semiconductor itself shrinks and then the number of impurity ions inside the volume decreases.

Like this, the downsizing pushes the assumption of long-range change (continuous approximation or mean-field approximation) into the validation limit. Accordingly, the discrete impurity-related fluctuation occurs. Since this relates on the statistics, it is impossible to remove it as long as adopting the device-scaling rule.

As mentioned above, the continuous approximation is from the long-range change idea that the potential profile smoothly varies throughout a semiconductor. However, the semiconductor has a crystal structure inside, wherein there are atoms or positive or negative ions on lattice points. (These atoms or ions are different from impurity ions.)

Accordingly, for example, a conduction electron emitted from an atom on a lattice point is inherently under the effect of the potential profile generated by positive ions allayed in the lattice. However, this potential profile changes in a short-range because it varies within a range of lattice constant.

Both potentials which vary in long-range and in short-range are a solution of the Poisson equation. However, the charge density included in this Poisson equation is composed of the impurity ion density which varies in long-range and the distribution of positive ions which are allayed regularly with lattice constant (i.e., varying in short-range). The latter is explicitly inconsistent to the assumption of the Poisson equation in the drift-diffusion model. On contrary, a potential which is a solution of the Poisson equation can be decomposed into the long-range and short-range components with regard to the characteristic length of charge distribution in space. On the other hand, in general, the crystal lattice has a periodic structure. Thus, according to the Bloch theorem, we can renormalize the short-range component with the periodicity to an effective mass of a carrier. However, the inverse of the effective mass is in proportion to the mobility. If we define the mobility with using this effective mass, we can regard that the lattice periodicity is renormalized to the mobility. Thus, only the long-range component is left.

The Poisson equation in the drift-diffusion model includes only the long-range components that was left artificially and thus is a special one which is different from the original (i.e., bare) Poisson equation. Unfortunately, there are many experts and researchers who misunderstand this point. This tells us how difficult this problem is. In mathematics, we can decompose a solution of the Poisson equation (potential distribution) into the long-range terms (the long-range potential distribution) and the short-range terms (the short-range potential distribution) by using the Fourier series formula (see "Physical Issues in Device Modeling: Length-Scale, Disorder, and Phase Interference" as the non-patent literature 1, published by N. Sano in the proceedings of SISPAD (2017) pp 1-4, in Kamakura, Sep. 7-9, 2017). To avoid a mistake, we call the Poisson equation (in the drift-diffusion model) as the long-range Poisson equation from now on.

However, the above-mentioned "renormalization to mass" is carried out on the short-range component with the periodicity and not on the long-range component. On the other hand, sometime impurity ions which have diffused through a semiconductor substrate (e.g., silicon) in the above-mentioned diffusion process replace atoms (e.g., silicon) layout on lattice points of the semiconductor. This replacement occurs probabilistically and thus we cannot control on which lattice points those impurity ions locate at all. Thus, the diffusion process may destroy the periodicity of crystal lattice and then leaves randomly localized scattering potentials with which conduction electrons or holes scatter. This localized scattering potentials may cause the fluctuating short-range component with no periodicity. This non-periodic short-range component can be renormalized to the mobility of carriers by the scattering theory.

By this way, the renormalization to the mobility apparently removes both periodic and non-periodic short-range components from the long-range Poisson equation. Thus, in the long-range approximation, the charge distribution generated by an aggregation of impurity ions is continuous. It is impossible to distinguish an impurity ion from the other impurity ions in this continuous potential distribution generated by the impurity ions.

Now, we describe the method to determine the long-range and short-range terms.

Note at first that it is possible to define impurity ion density even in the continuous approximation. Then, from the inverse of the impurity density to the power of ⅓, we can extract the average distance between impurity ions before taking the continuous approximation. We call this length as the average ion distance. Accordingly, we require the wavelength that is the inverse of wavenumber as longer than this average ion distance. By this way, we can grab the essence of the long-wavelength approximation. The average ion distance becomes short as the impurity ion density increases. On contrary, it becomes longer as the impurity ion density decreases.

However, we have ignored many-body effect in the above description.

Before doing the long-wavelength approximation, for example, we suppose that there are a positive ion and six electrons while the electric charge of this ion is equivalent to five electrons. Accordingly, if five electrons surround this positive ion to form a circle according to the attractive force, the charge neutrality may be satisfied within this circle. Thus, it appears that the electric field vanishes outside of the circle. Since there is a repulsive force between any two of these five electrons, the radius of this circle cannot be limitlessly small. When the repulsive and attractive forces form a detailed condition, we can regard the radius as the screening length in this picture. Thereby, the remaining one electron may behave like there is not this positive ion, if this electron exists outside of this circle. Of course, this picture is too simplified. The valence number of ions to be doped into silicon is usually one, and then plural electrons won't surround a positive ion to form a circle inside which the charge neutrality is satisfied. However, if there are plural electrons between a target electron and a positive ion with the valence number being one, it may sometime be difficult for the Coulomb force to reach from the ion to the target electron. The effect to shrink the range of the Coulomb interaction like this is called the screening effect. The characteristic length to determine the shrunk range of the interaction is the screening length. More in practice, we should take into account that the screening length differently works sensitive to the change of channel of an electron device from inversion layer, depletion layer to accumulation layer.

Next, let us consider a physical system composed of plural impurity ions having positive charge (with the valence number being one for example). However, the number of electrons is sufficiently larger than the number of the impurity ions. Furthermore, we assume that all impurity ions are screened at an equilibrium state. Now a certain electron approaches to an impurity ion from far. If the impact factor of this electron and the impurity ion is larger than the screening length, this electron behaves like there is not the impurity ion. On contrary, if the impact factor is smaller than the screening length, the short-range Coulomb scattering occurs between this electron the impurity ion. This short-range Coulomb scattering corresponds to the above-mentioned non-periodic short-range component. However, the impact factor is the distance between the pass through which this electron approaches from far to the impurity ion.

In the drift-diffusion model, we renormalize this short-range Coulomb scattering to the mobility that is the coefficient to the drift term and then remove the short-range component from the coupled equations. That is, the screening length is the cut-off to remove the short-range component from the drift-diffusion model, where the long wavelength approximation is applied to. In other words, by dividing the long and short wavelength components (respectively corresponding to the long-range and short-range terms) with the screening length, the short-range component is apparently removed from the coupled equations.

In the drift-diffusion model that is the long wavelength approximation like this, a conduction electron transports through a smoothly varying distribution of potential from source to drain. Accordingly, no matter how small the simulation sample of electron device is, it is impossible for the drift-diffusion model to appropriately simulate the impact of fluctuation of impurity ions' distribution which is a discrete embodiment (Random Dopant Fluctuation).

Let us consider an accumulation layer on the surface of N-type semiconductor substrate, wherein an aggregation of donor ions (impurity ions) and an aggregation of conduction electrons. However, the number of conduction electrons is much more than the number of the donor ions. If the impurity ion density is so low that the average ion distance is longer than the screening length, each ion is screened within the screening length. We can thus regard that the remaining electrons which are not used for the screening behave like apparent free electrons. This picture is consistent to the drift-diffusion model.

On contrary, what happens if the impurity ion density is so high that the average ion distance is shorter than the screening length? For example, can twice number of electrons surround two impurity ions to neutralize their positive charge together? In this event, how can we define the screening length? Furthermore, what happens if the screening length is extremely long? In this event, we can regard the whole physical system as screened completely, and then leaving only the zero Fourier component. However, it is not realistic to consider that such a situation always occurs in real electron devices.

On the other hand, if the surface of the N-type semiconductor surface, the number of electrons surrounding an impurity ion is so insufficient that the effect of electrons' screening the long-range Coulomb component of the impurity ion is suppressed. Thus, the leaked part of the long-range Coulomb component causes the appearance of fluctuation. We can regard that a similar situation occurs in the vicinity of threshold voltage. This may cause the sensitivity of the location of impurity ions. However, it cannot be consistent to the drift-diffusion model.

SUMMARY OF THE INVENTION

The present disclosure is made in order to consider the above-mentioned issues. A physical model is provided to comparatively easily reproduce the random dopant fluctuation that has been difficult to be simulated rigorously due to the long wavelength approximation adopted in the drift-diffusion model. By this way, the goal of the present invention is to improve the reliability of the device simulation of the random dopant fluctuation.

By using this disclosure, we are able to perform an effective simulation of the fluctuation due to discrete impurity distribution which has been omitted in the long wavelength approximation of the hydrodynamic device simulation adopting the drift-diffusion model.

The definition of the cut-off to distinguish long-range and short-range terms in the drift-diffusion model is not always clear, even though it is important to study a realistic electron device. However, if we assume that it is the inverse of the screening length, there may be three following formulae (Eqs. 1-3) which are expected to define the screening length.

$$\text{screening length} = \sqrt{\frac{(\text{permittivity}) \times (\text{thermal energy})}{q^2(\text{electron density})}}. \quad (1)$$

$$\text{screening length} = \min\left\{\left(\frac{3}{4}\pi(\text{average ion density})\right)^{-\frac{1}{3}}, \right. \quad (2)$$

$$\left. \sqrt{\frac{(\text{permittivity}) \times (\text{thermal energy})}{q^2(\text{electron density})}}\right\}.$$

$$\text{screening length} = \quad (3)$$

$$\sqrt{\frac{(\text{permittivity}) \times (\text{thermal energy})}{q^2(\text{average ion density})}}.$$

However, q is the elementary charge and the (thermal energy) is the product of the Boltzmann constant and the absolute temperature. More in detail, this absolute temperature is a numeral converted from the semiconductor temperature (lattice temperature) in Kelvin unit and in particular the absolute temperature of channel region wherein there are carriers such as conduction electrons and holes which relate to the screening effect. Here, what is denoted as the (average ion density) is identical to the density of impurities inside semiconductor in the continuous approximation or the impurity charge density. The (permittivity) is the permittivity of the semiconductor which is doped with the impurities. We investigate which one among these three formulae (Eqs. 1-3) is most preferable.

FIG. 1 is a drawing to illustrate an example of simulation sample to perform the simulation. This simulation sample can be regarded as a part of a whole of electron device. Along the Z-axis, there are a substrate of semiconductor (semiconductor substrate) with the thickness being 50 nm, a film of dielectrics (dielectric film) or film of insulator (insulating film; e.g., oxide film) with the thickness being 2 nm and a gate of aluminum (Al) from the bottom. The area in the XY plain is 50 nm squares. The impurity ion density of the semiconductor substrate is ten to the power of 18 per cubic centimeter. However, the impurity ions are all assumed to be continuous. The substrate of this simulation sample is a continuous body to compare the coming simulation with that in the continuous approximation.

In FIG. 2, a central portion of the continuous body of the simulation sample in FIG. 1 is removed and then reimbursed with a discrete body (semiconductor) wherein discrete impurity ions distributes. However, there is the continuous body with the impurity density being ten to the power of 18 per cubic centimeter in the 2 nm at the bottom along the Z-axis. The cross-sectional area and height of the above-mentioned discrete body are 42 nm square and 46 nm, respectively. There are 81 positive ions (discrete) with the valence number being one inside the discrete body surrounded by the continuous body with the average ion density being ten to the power of 18 per cubic centimeter. The replacing discrete body and the surrounding continuous body composes the semiconductor substrate. These simulation samples will be used with the above three formulae (Eqs. 1-3).

In the above simulation, we, at first, solve the Poisson equation while grounding the substrate bottom and applying the gate voltage to the gate (Al) in FIG. 1. Next, we solve the Poisson equation by adopting the formulae of Eqs. 1-3 to the discrete body while grounding the substrate bottom and applying the gate voltage to the gate (Al) in FIG. 2. Subsequently, we calculate the capacitance by integrating the respectively calculated charge distributions in the semiconductor throughout the XY plain along the Z-axis. The result is shown in FIG. 3. It shows the characteristics of PMOS capacitor since we assumed that impurity ions have a positive charge. Accordingly, there is the inversion region in the left-hand side from the voltage (about −1.5 V) where the capacitance abruptly increases. There is the accumulation region in the right-hand side from the voltage (about 0V) where the capacitance abruptly increases. There is the depletion region between them.

To calculate the capacitance in the simulation sample of FIG. 2, we have integrated the whole body of the semiconductor substrate. Therefore, the calculated capacitance must be independent from the fluctuation of impurities which distributes therein. Accordingly, if the screening length is appropriately defined, the simulation by FIG. 2 results in the same with the simulation by FIG. 1. As shown in FIG. 3, the result by Eq. 3 is most agreeable to the result by using the continuum (the sample of FIG. 1) in the whole region composed of accumulation, depletion, flat band and inversion. By this way, we can find that the screening length of the present disclosure is proportional to the square root of the permittivity, proportional to the square root of the thermal energy and inversely proportional to the square of the average ion density (impurity charge density).

As described above, it might appear that the screening effect cannot deduce the random dopant fluctuation if we adopt the long wavelength approximation with the most agreeable definition of the screening length. However, according to the experiment, the random dopant fluctuation is measurable in the threshold voltage fluctuation (see "Verification of Threshold Voltage Variation of Scaled Transistors with Ultralarge-Scale Device Matrix Array Test Element Group" as non-patent literature 2, published by T. Tsunomura, A. Nishida, and T. Hiramoto, Japanese Journal of Applied Physics 48 (2009) 124505).

The distribution of discrete impurity ions is out of control even in any manufacturing process of electron device. Therefore, the distribution of impurity ions in a cell is different from that in the other cells. If the distribution of impurity ions is impactful to threshold voltage, the threshold voltage of multiple electron devices may vary.

The screening effect that suppresses the impurity fluctuation like this theoretically is one of most important effect in the many body problem and has been studied for long time in the field of theoretical physics. As a result, the screening effect can be approximated by regarding the Yukawa-type potential exponentially decaying with the screening length being the characteristic length as the scattering potential. By this way, the long wavelength potential can be described by the following equation.

$$\text{long wavelength potential} = \quad (4)$$

$$\frac{q}{4\pi(\text{permittivity})}\frac{1}{(\text{distance})}\{1 - e^{-(\text{distance})/(\text{screening length})}\}.$$

However, Q is the charge of this impurity ion and its absolute value is equivalent to or as integral multiple as that of the elementary charge. This integer is the valence number of this ion. Accordingly, in the case of a positive ion with the valence number being M, Q=Mq. In the case of a negative ion with the valence number being M, Q=−Mq. In Eqs. 2 and 3, we assumed M=1. The first term in the bracket is a solution of the bare Poisson equation and corresponds to a bare potential which is obtained by ignoring the screening effect. The second term is what is used to subtract the screening effect relating to the short-range terms. However, the (distance) is the distance from a location where a discrete impurity ion exists. Moreover, the bare Poisson equation is the original Poisson equation before converted to the long wavelength Poisson equation.

By this way, the impurity charge density in the long wavelength approximation can be described as follows:

$$\text{long wavelength impurity charge density} = \quad (5)$$

$$\frac{q}{4\pi}\frac{1}{(\text{permittivity})^2}\frac{1}{(\text{distance})} - e^{-(\text{distance})/(\text{screening length})}$$

In the long wavelength approximation, an impurity ion which was used to be a point charge may distribute in space with the characteristic length being the screening length. In other words, the point charge is grained to spread continuously within the rage of the screening length. This is consistent to a kind of mean-filed in the many body theory. In order to solve the long wavelength Poisson equation of the drift-diffusion model, we have to use this long wavelength impurity charge density. More concretely, we have to replace the impurity density of the long wavelength Poisson equation described in a continuum with this long wavelength impurity charge density.

In general, the goal of many body theory as a phenomenological theory related to a matter is to describe a macroscopic property of the matter, which is hardly described in a classical manner because there is huge number of microscopic and quantum mechanical events which overlap each other inside the matter. For example, in a magnetic phenomenon, if somewhat macroscopic stimulation is given to a matter from an external, a huge number of microscopic and quantum mechanical events overlap to respond in order to suppress the impact of the external stimulation inside. These overlapped microscopic responses can be linearized to be macroscopic according to the idea of mean-field approximation by assuming that the number of the overlapping events is very huge and random inside the matter. Then, the macroscopic response is exposed to the external as the result of the linearization.

Here, we assumed, in the mean-field approximation, that each microscopic response is homogenous. That is, even though on which lattice points impurity ions respectively locate is completely random, the property of these impurity ions is homogenous regardless of the locations.

We may design a laboratory system for a basic research of physics so that the condition for this mean-field can be suitable. However, an electron device is designed to satisfy the market demand such as Moore's law. Accordingly, we cannot design the electron device so that the mean-field (the screening effect in this event) can fortunately suppress the random dopant fluctuation. So far, by chance, very luckily, the screening effect used to suppress the random dopant fluctuation. The device scaling rule was formulated by grabbing the essence of this fact. The limitation of Moore's law is an omen that this luck becomes invalidated with the device scaling.

Indeed, a path through which a conduction electron transport near to the semiconductor surface is very close to the interface to the insulating film. There may be a discrepancy from the mean-field in the vicinity of the channel interface like this (i.e., the interface between the semiconductor surface with the channel and the insulating film). Then, this discrepancy may become noted with the miniaturization.

As an example, if an impurity ion is closer to the channel interface beyond the screening length, the number of electrons becomes insufficient in the channel so that the screening effect becomes incomplete. Or on earth, the long-range Coulomb component can reach the channel interface to incomplete the screening effect. Like this, impurity ions near to the channel interface may behave different from the ions locating far from the channel interface. This may not satisfy the condition of the homogeneity. Furthermore, whether an impurity ion locates in the side of source or drain may break the condition of the homogeneity. Thus, even though the impurity ions themselves are homogeneous, interestingly, they can behave as heterogenous because the screening level is dependent of the location of an ion.

By this way, heterogenous impurity ions which are incompletely screened to be dependent of the locations may distribute randomly in the channel. When measuring threshold voltages of multiple electron devices, this may cause threshold voltage to vary. The statistical width of this is the random dopant fluctuation.

Below we explain the most preferable embodiment of the present disclosure in concrete by using drawings.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
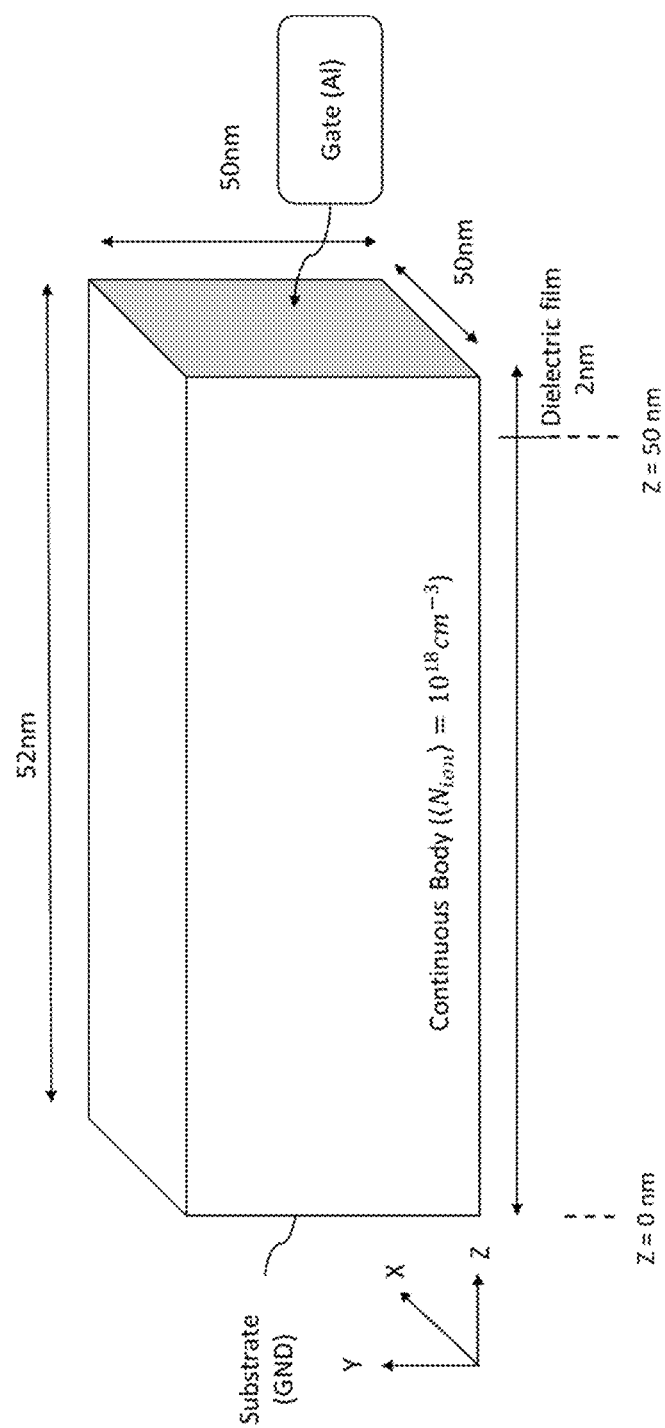
FIG. 1 is an illustration describing an example of simulation sample.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

The embodiments related to the present disclosure will be explained with the detailed description given hereinafter and the accompanying drawings.

The preferred embodiment of the disclosure is discussed below.

Noticing that incompletely screened impurity ions can obtain the location dependence, we reproduce this physical phenomenon with using an easy analytical formula. The present disclosure relates to the simulation method to implement this analytical formula to the device simulator simply.

Figure 4:
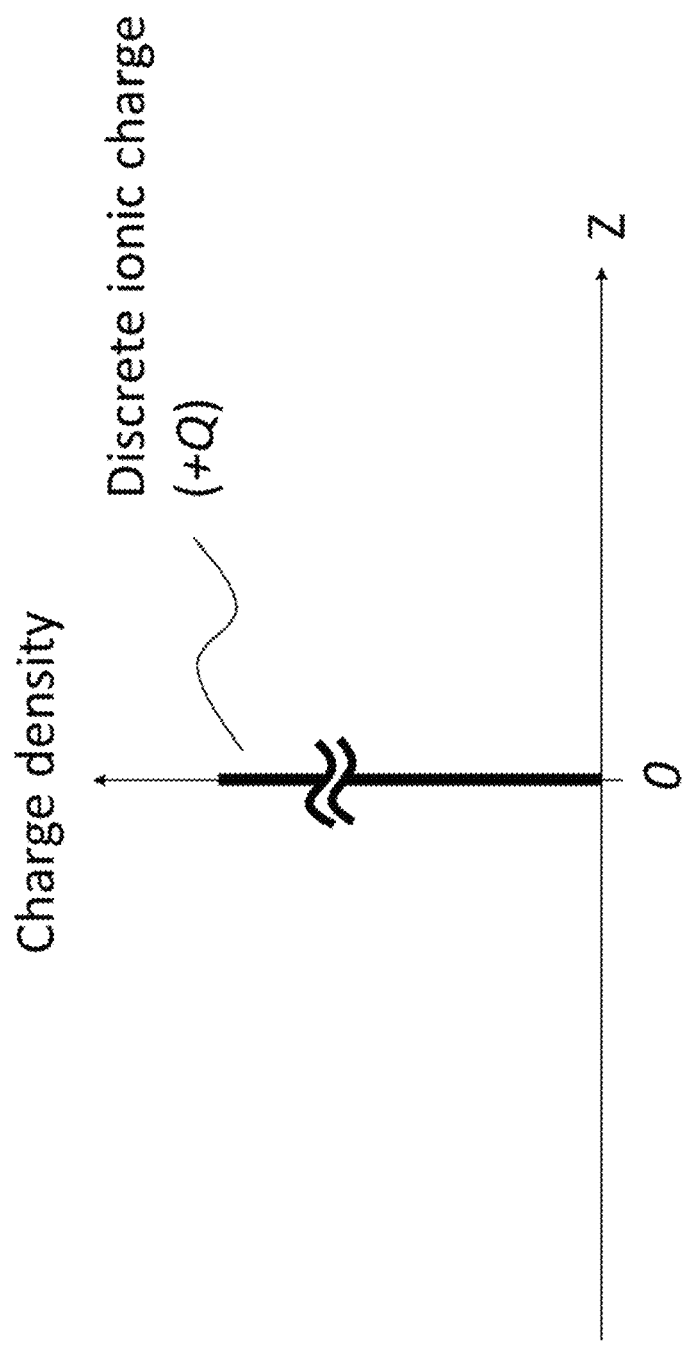
FIG. 4 is an illustration describing an example of the charge density of a point charge.

For reducing the difficulty of the description, we assume that the space is one-dimensional. As an example, shown in FIG. 4, there may be an impurity ion which is a point charge locating at the origin along the Z-axis which goes through the central of the discrete body shown in FIG. 2.

Figure 5:
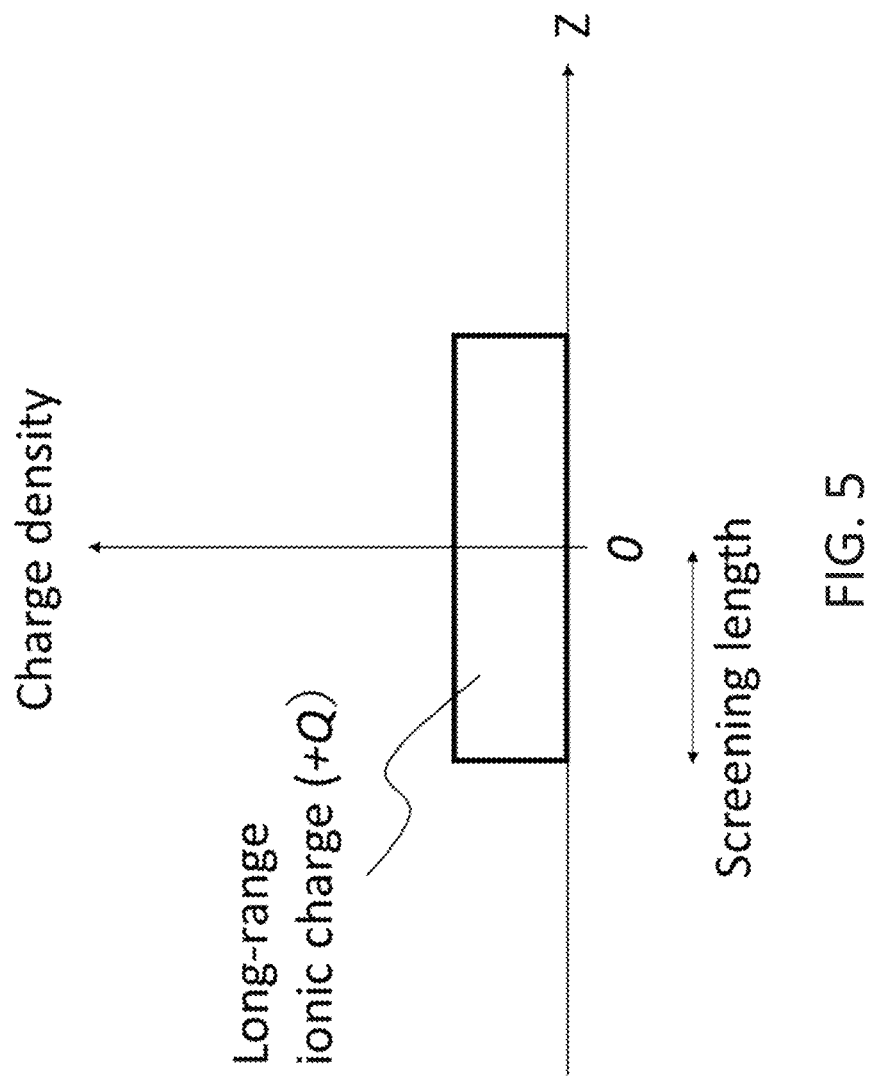
FIG. 5 is an illustration describing an example of the charge density of a point charge in the long wavelength approximation.

If applying the above-mentioned long wavelength approximation to a physical system wherein this point charge exists, the point charge can be converted to be a continuous charge distribution like Eq. 5. However, for reducing the difficulty of the description, we assume that the charge distribution is homogenous within the range of the screening length, as shown in FIG. 5. By integrating this charge distribution along the Z-axis, we can obtain +Q.

Figure 6:
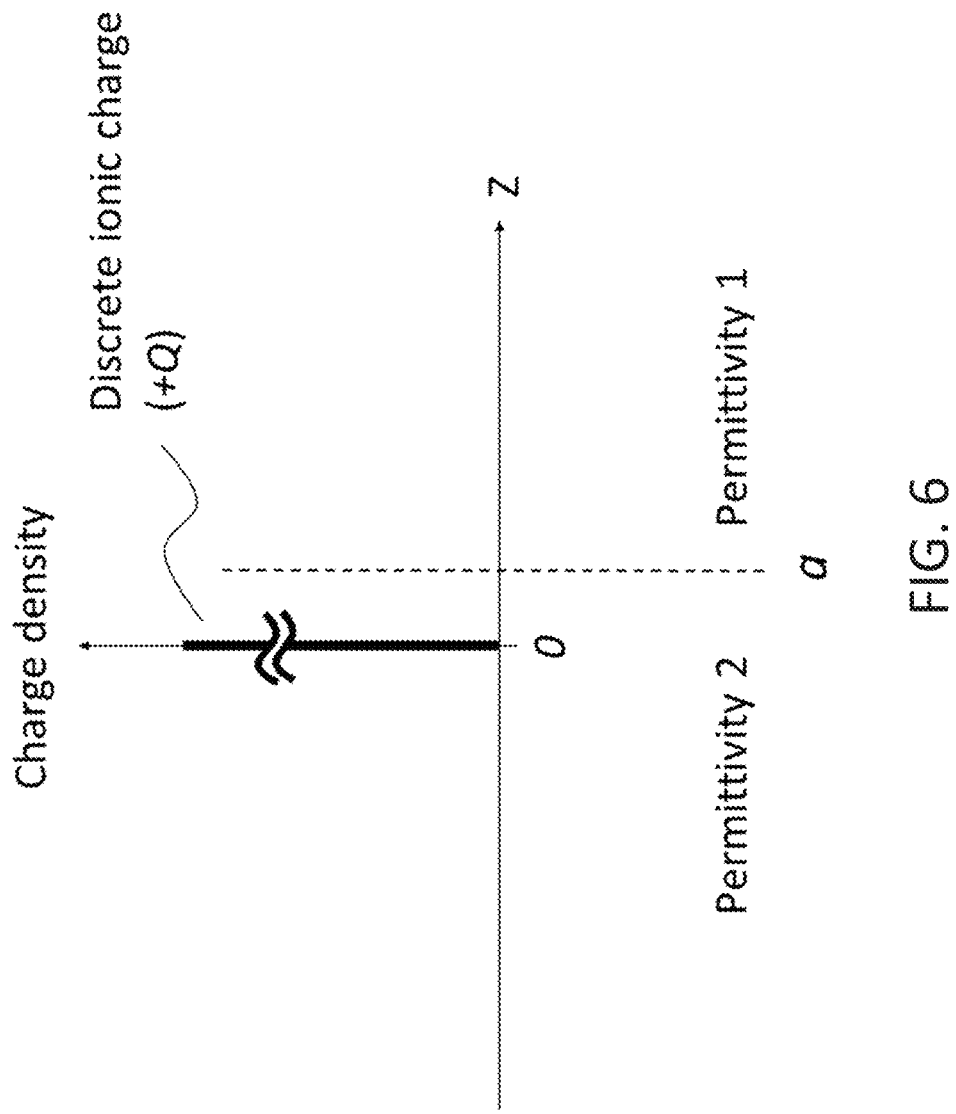
FIG. 6 is an illustration describing an example of the charge density.

In FIG. 6, there is the interface at the location far from the point charge to the positive direction along the Z-axis by a. There are the materials having the permittivity 1 and 2 in the left-hand and right-hand side from Z=a, respectively. Note that the potential distribution is dependent of the permittivity change at the interface (Z=a) but the charge density is not.

Figure 7:
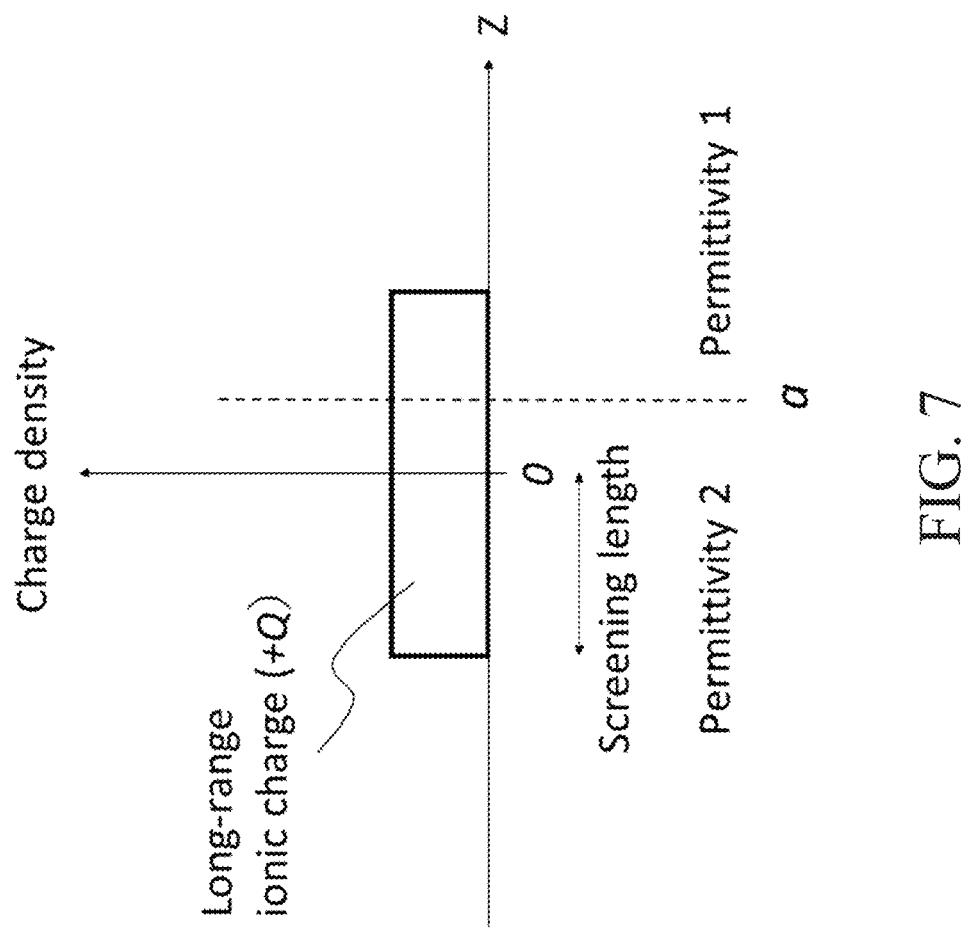
FIG. 7 is an illustration describing an example of the charge density of a point charge in the long wavelength approximation in the case with an interface.
Figure 8:
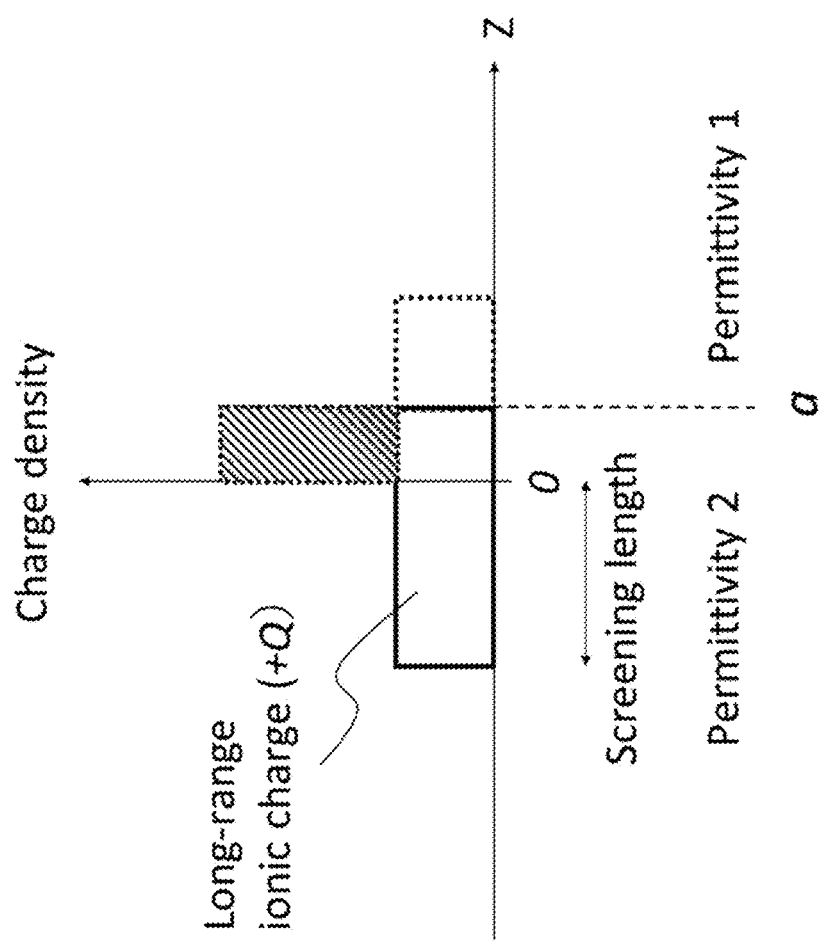
FIG. 8 is an illustration describing an example of the charge density of a point charge in the long wavelength approximation in the case with an interface.

However, as mentioned above, if the screening length is longer than the distance to the interface (that is, a) in the long wavelength approximation, as illustrated in FIG. 7, this charge distribution may invade into the material having the permittivity 2. In the case that the material having the permittivity 2 is an insulating film such as an oxide, the charge cannot distribute in this region. By considering this impact, we can find that the charge distribution may increase inside the region of the permittivity 1, as shown in FIG. 8. This means that apparently a polarization is generated at the interface. We can regard this polarization as a part of electrostatic effects. It is self-evident that the polarization is dependent of the distance of the impurity ion from the interface. Thus, the above-mentioned location dependence may be caused, while the integrated charge quantity is unchanged (that is, +Q).

Figure 9:
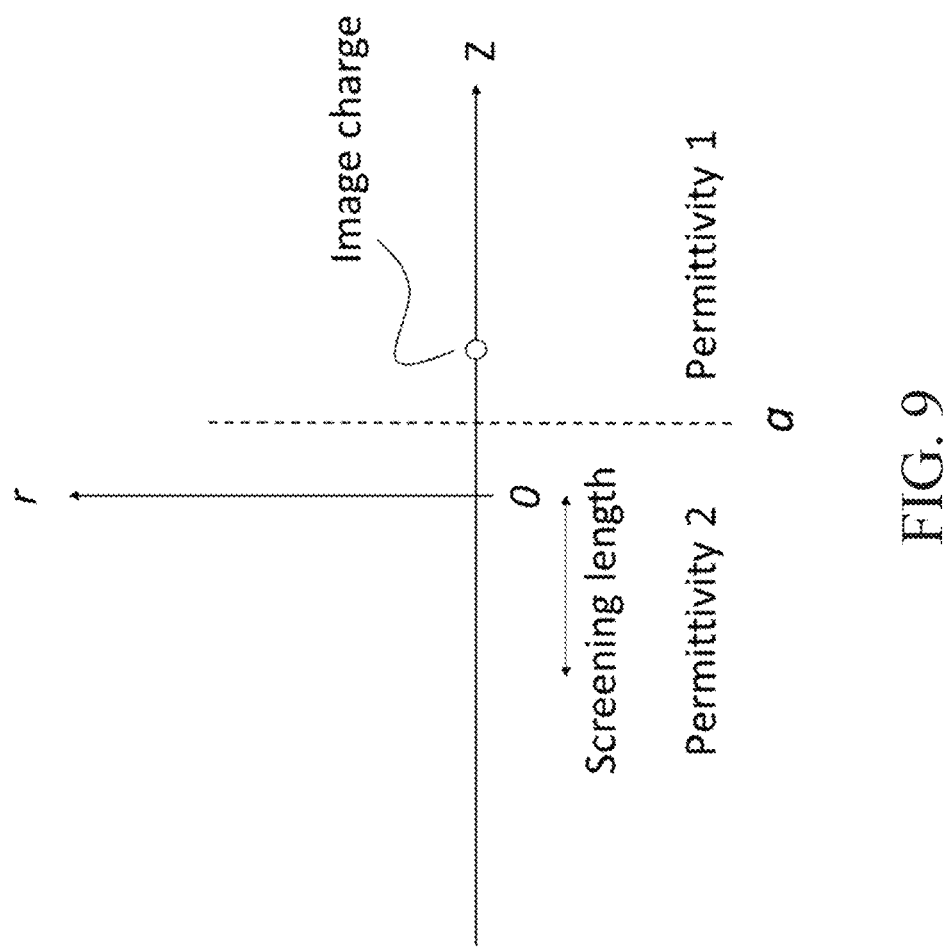
FIG. 9 is an illustration describing an example of an image charge.

To reproduce this polarization in a simple manner, as illustrated in FIG. 9, we may put a point image charge inside the region of the permittivity 2, which can impose the electrostatic effect corresponding to the polarization. However, in this figure, we have adopted the cylindrical coordinate with the radius being r. We have ignored the rotational angle due to the symmetry. Eq. 6 can be obtained by adding this polarization component to Eq. 5. The second term of this Eq. 6 corresponds to the polarization component of the image charge in the material of the permittivity 2. The first term corresponds to Eq. 5.

$$\text{long wavelength impurity charge density} = \qquad (6)$$

$$\frac{Q}{4\pi} \frac{1}{(\text{screening length})^2} \times \left\{ \frac{e^{-\sqrt{r^2 + \Sigma^2}/(\text{screening length})}}{\sqrt{r^2 + z^2}} + \frac{2(\text{permittivity})_1}{(\text{permittivity})_2 + (\text{permittivity})_2} \frac{e^{-\sqrt{r^2 + 2Za - \Sigma^2}\,(\text{screening length})}}{\sqrt{r^2 + (2a-2)^2}} \right\}$$

However, 2a-z is the distance from the image charge along the Z-axis and the maximum of z is a in the material having the permittivity 1. In order to solve the long wavelength Poisson equation in the drift-diffusion model, we may replace the impurity density which is described in a continuum with this long wavelength impurity charge density. By this way, the first term in the bracket in the right-hand side of Eq. 6 is inversely proportional to the distance from the impurity ion and decays with the characteristic length being the screening length. The second term of the bracket in the right-hand side of Eq. 6 is inversely proportional to the distance from said image charge and decays with the characteristic length being the screening length. Furthermore, it is proportional to the permittivity 1 and inversely proportional to the permittivity 1 and 2. Moreover, since the long wavelength impurity charge density is inversely proportional to the square of the screening length, if resolving the bracket in the right-hand side of Eq. 6, both said first and second terms are inversely proportional to the square of the screening length. The analytical representation of the fluctuation due to locations of impurity ions, which is consistent to the long wavelength approximation, like this, is helpful to perform the simulation of the random dopant fluctuation by using the device simulation based on the assumption of the drift-diffusion model while suppressing the increase of simulation time.

Figure 2:
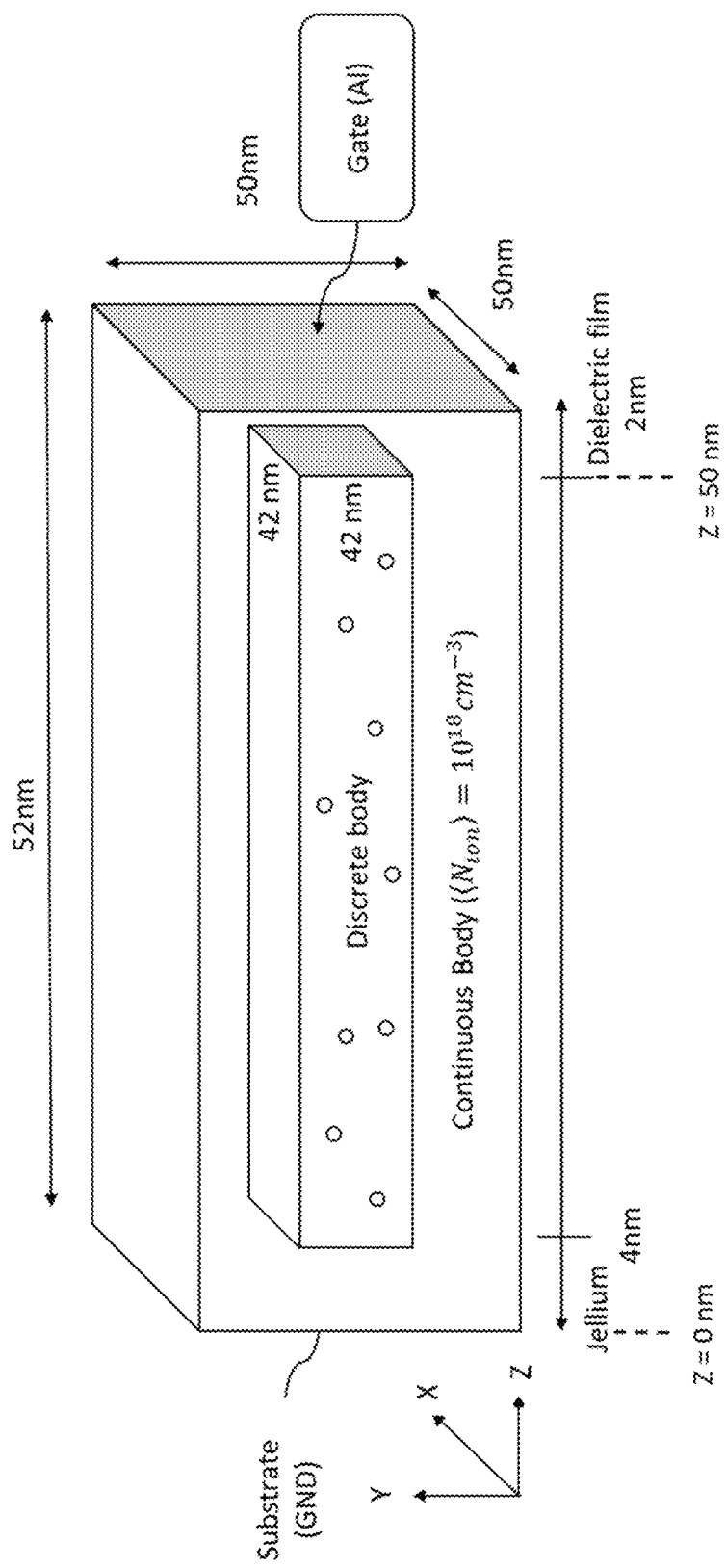
FIG. 2 is an illustration describing an example of simulation sample.
Figure 3:
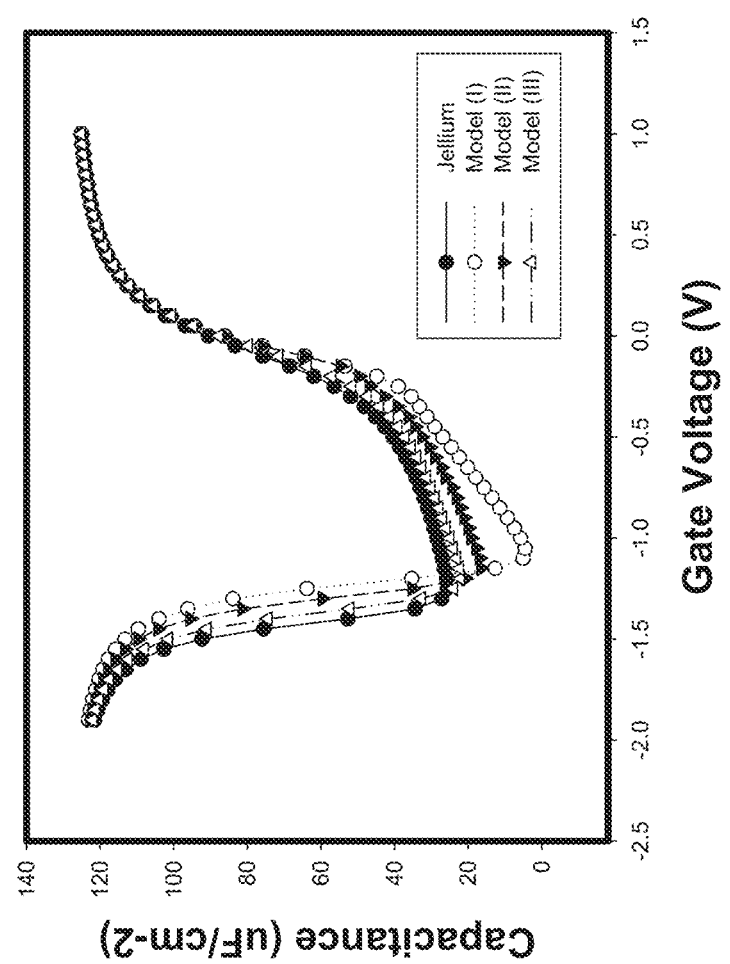
FIG. 3 is an illustration describing an example of the simulation results.

Comparing FIGS. 1 and 2, the region of the permittivity 2 corresponds to the oxide film. If it is a silicon dioxide film, the permittivity 2 is as 3.4 times as the vacuum permittivity. In the case of higher permittivity film, the permittivity 2 is higher than 3.9. In recent years, the permittivity of high-K dielectric film is generally raging as 25-30 times as the vacuum permittivity. The region of the permittivity 1 corresponds to the semiconductor region. Accordingly, if the semiconductor is silicon, the permittivity 1 is as 11.7 times as the vacuum permittivity. In particular, we should note that the potential distribution inside the permittivity 1 (semiconductor) is most impactful on the electrical property of an electron device.

By calculating the long wavelength impurity charge density with Eq. 4, we can obtain only the first term of the bracket in the right-hand side of Eq. 6. This is homogeneous because it is independent of the location of an impurity ion. Accordingly, by adding the second term corresponding to an image charge, the location dependence of an impurity ion is generated in the potential distribution inside the semiconductor. On contrary, without this second term, it may be same with Eq. 5 and then it is impossible to simulate the random dopant fluctuation.

Figure 10:
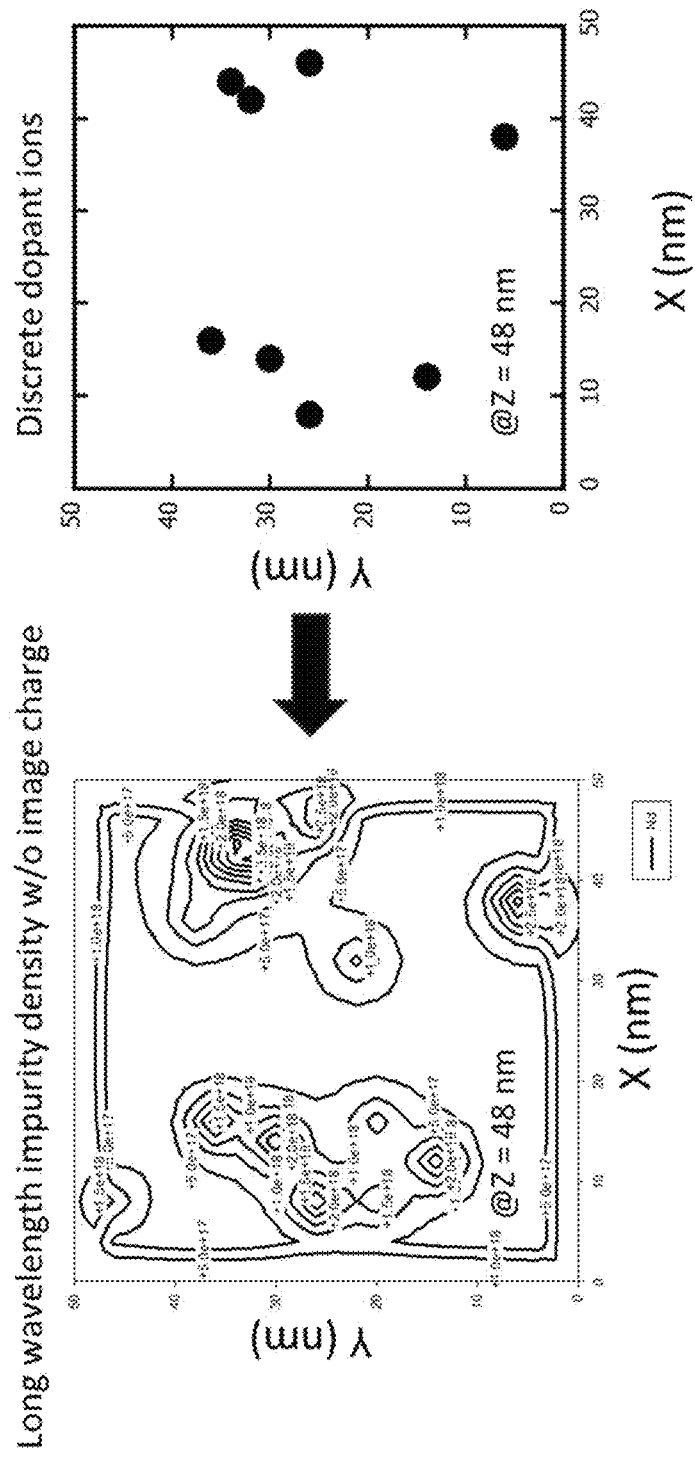
FIG. 10 is an illustration describing an example of the long wavelength impurity charge density (without an image charge).

The right hand-side in FIG. 10 is the plot of discrete impurity ion distribution at the cross-section at Z=48 nm in FIG. 2. The screening length is defined by Eq. 3 and Eq. 5 is applied to the discrete impurity ions which distribute inside the discrete body. Then, we calculate the long wavelength impurity charge density of each discrete impurity ion. By summing up the calculation results, the distribution of the discrete impurity ions is converted to the left-hand side of FIG. 10.

Figure 11:
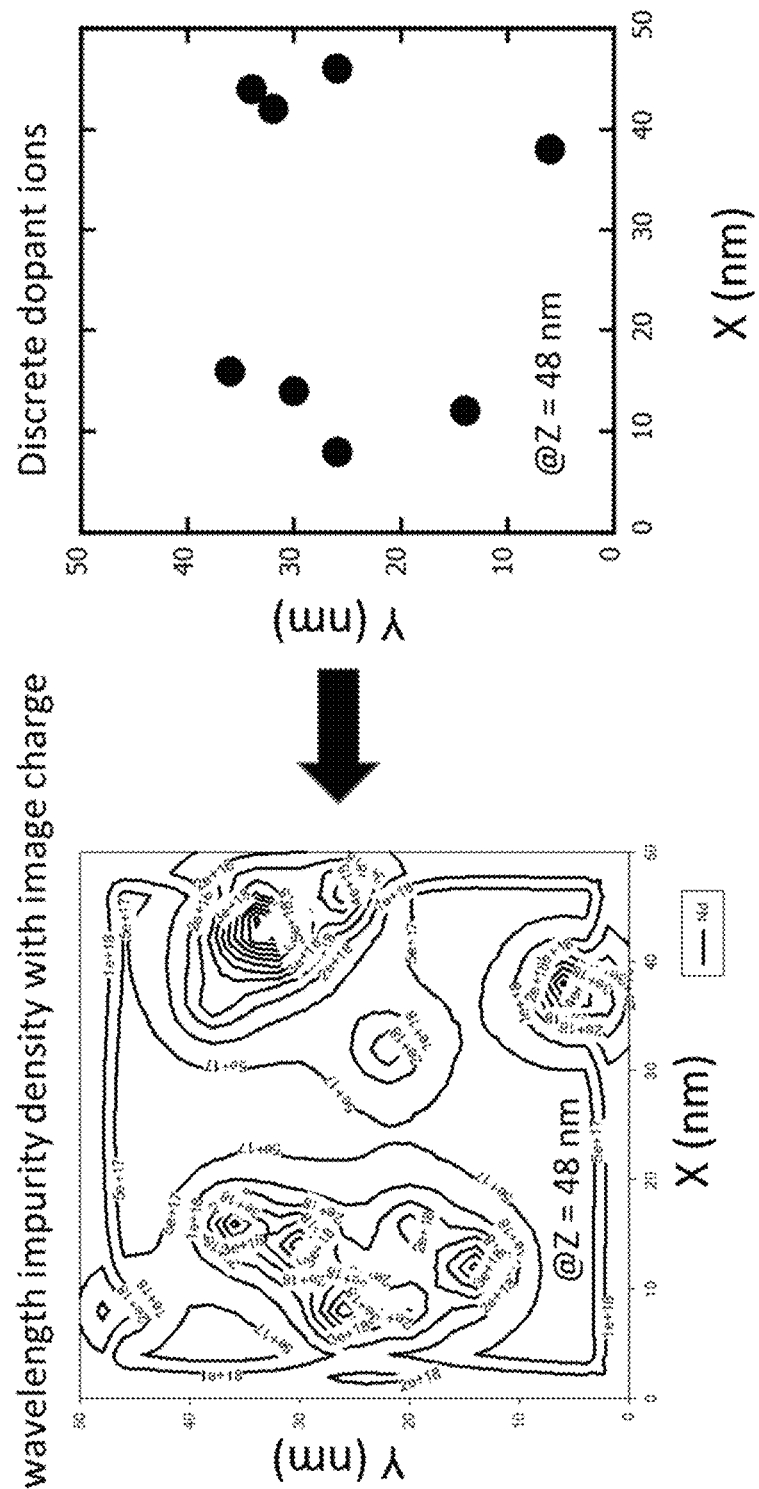
FIG. 11 is an illustration describing an example of the long wavelength impurity charge density (with an image charge).

In the right-hand side of FIG. 11 is the plot of discrete impurity ion distribution and is consistent to the right-hand side of FIG. 10. The screening length is defined by Eq. 3 and Eq. 6 is applied to the impurity ions which distribute inside the discrete body. Then, we calculate the long wavelength impurity charge density of each discrete impurity ion. By summing up the calculation results, the distribution of the discrete impurity ions is converted to the left-hand side of FIG. 11.

That is, we can find the effect of the second term by comparing the left-hand side of FIG. 10 (without an image charge) and the left-hand side of FIG. 11 (with an image charge).

Figure 12:
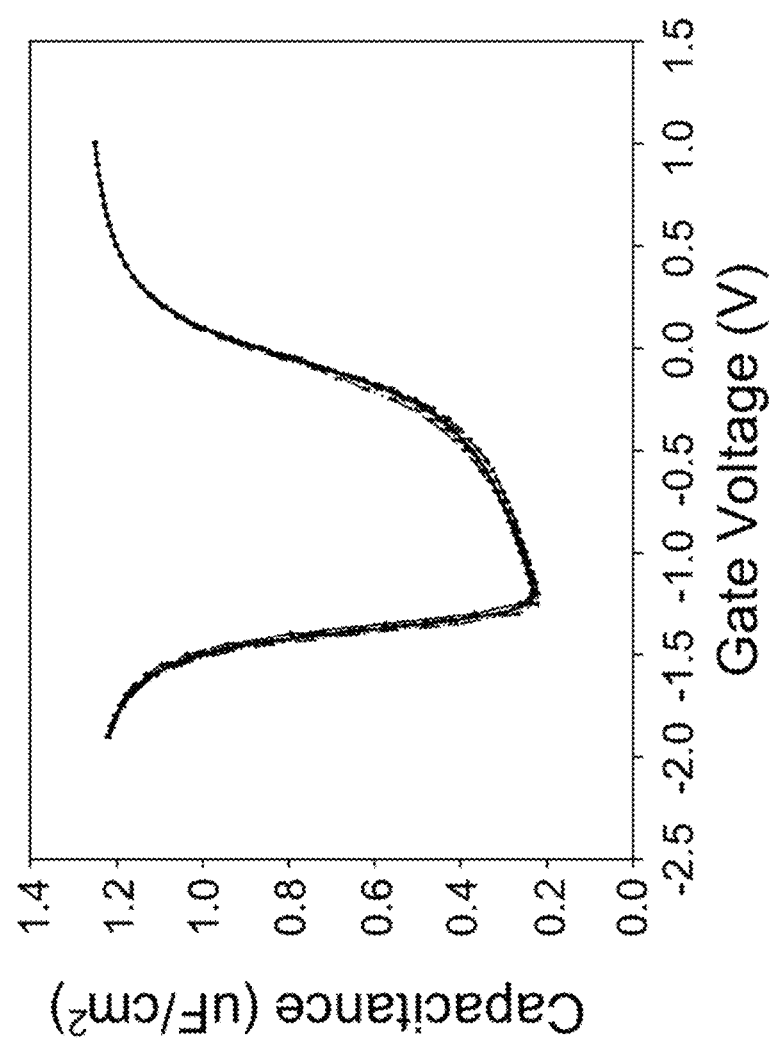
FIG. 12 is an illustration describing an example of the calculation result of CV characteristics by the long wavelength impurity charge density of 10 samples (with an image charge).

FIG. 12 is the characteristics of the capacitance-voltage (CV) in the long wavelength impurity charge densities calculated by applying the screening length of Eq. 3 and the image charge of Eq. 6 to 10 samples of FIG. 2, which have various distributions of discrete impurity ions inside the discrete body. There are clear discrepancies among the calculated characteristics of only 10 samples, even though the integration along the Z-axis may suppress the location dependence in the calculation of the capacitances.

In an actual LSI chip, there are one billion transistors integrated in a 1 Gb product. Thus, if we plot the CV of all transistors in a 1 Gb chip product, we can find a larger fluctuation than in FIG. 12.

Figure 13:
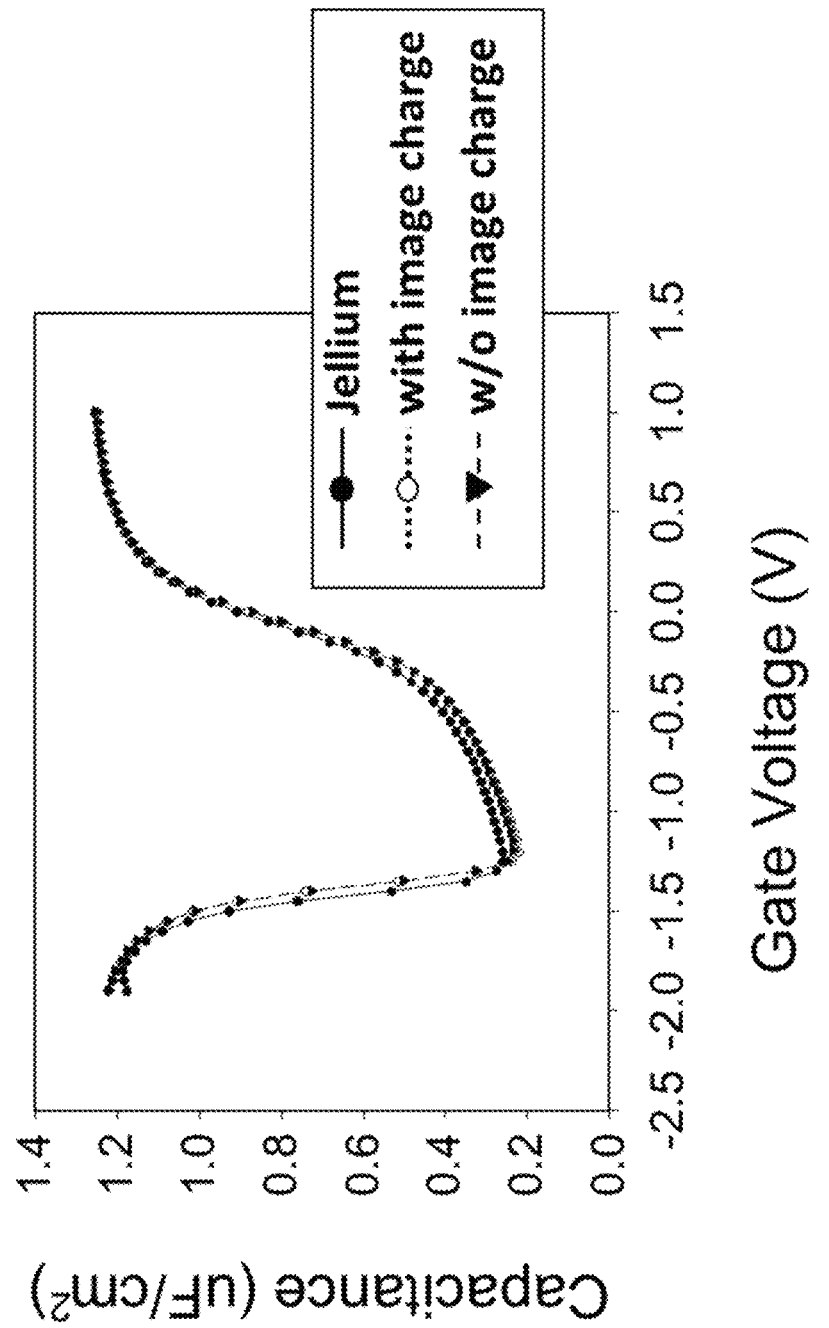
FIG. 13 is an illustration describing an example of the calculation result of CV characteristics by the long wavelength impurity charge density of 10 samples (with an image charge).

FIG. 13 is the plot of the CV-characteristics in the long wavelength impurity charge density calculated by applying the screening length of Eq. 3 with Eq. 5 (without an image charge) and Eq. 6 (with an image charge) to 100 samples of FIG. 2, which have various distributions of discrete impurity ions inside the discrete body. The open dots depict the data with an image charge and the inverse closed triangles depict the data without an image charge. The closed dots depict the CV characteristics calculated in the case of a continuous body corresponding to the sample shown in FIG. 1, which is plotted for the comparison.

Figure 14:
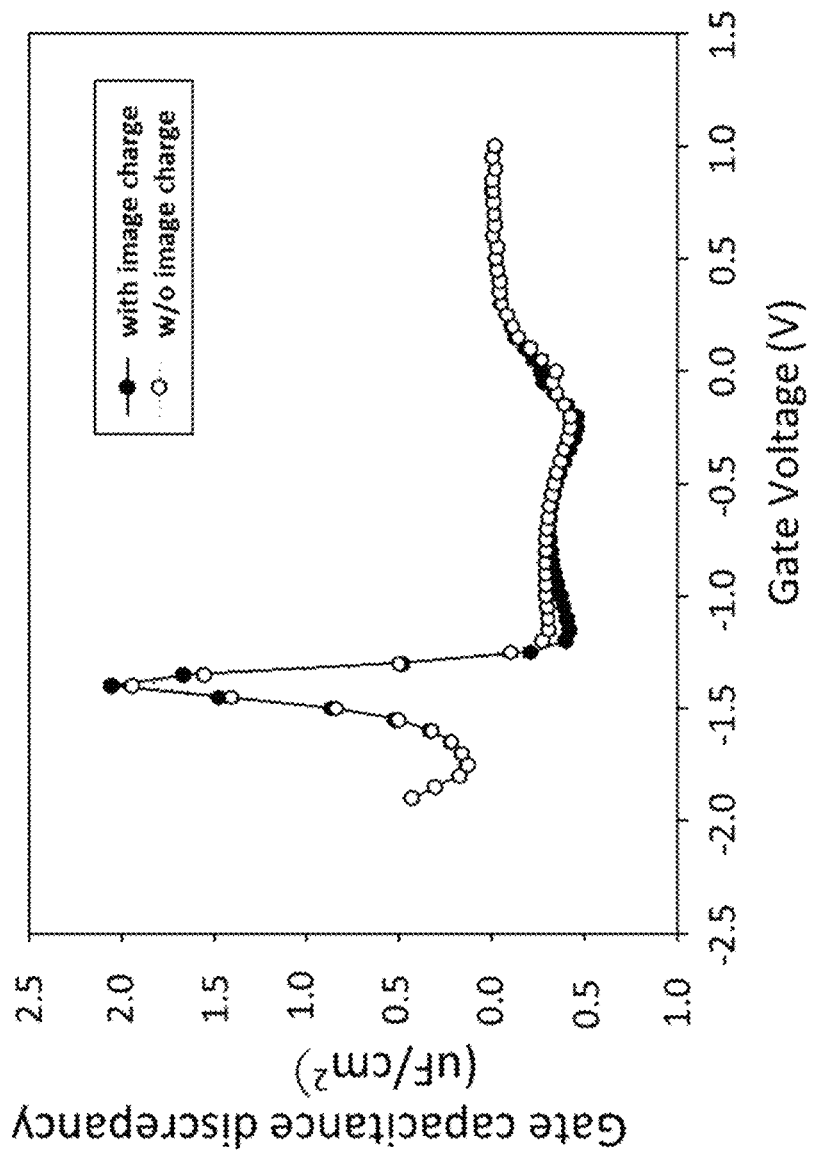
FIG. 14 is an illustration describing an example of the simulation result of the discrepancy of gate capacitance.
Figure 15:
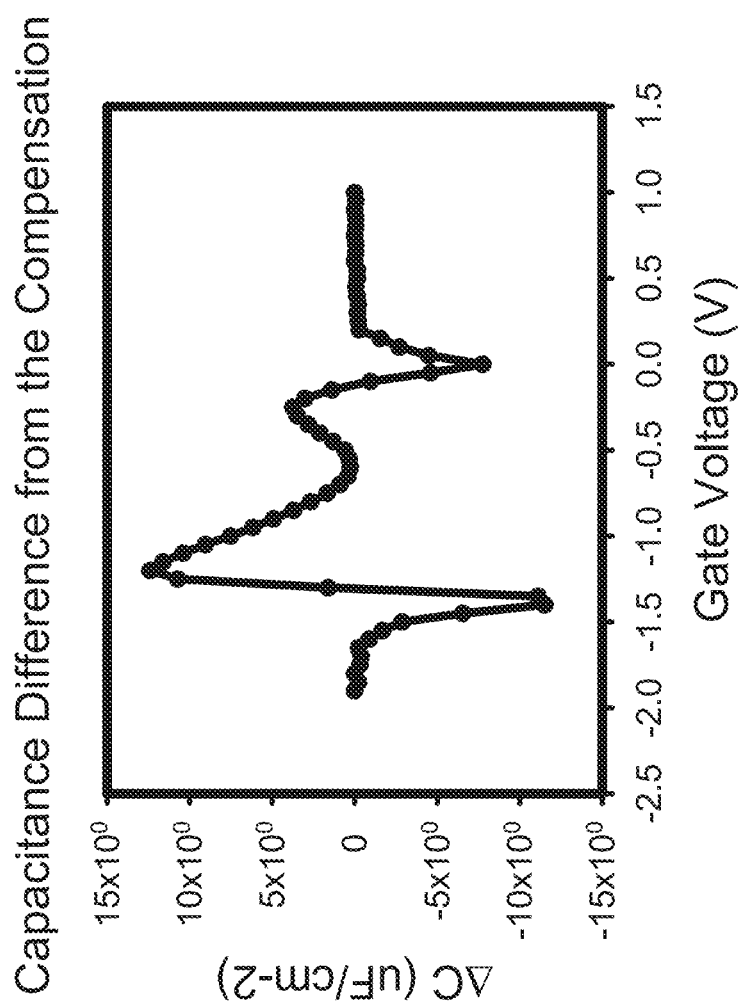
FIG. 15 is an illustration describing an example of the simulation result of the discrepancy of gate capacitance.

In FIG. 14, we plot the averaged discrepancies in the calculated capacitances from the continuous body with and without the image charge by using 100 samples. In both cases, the discrepancy from the continuous body is maximized at the threshold voltage (about -1.5 V). Thus, we can find that the impact of the long wavelength component likely appears about a threshold voltage. In FIG. 15, we plot the averaged discrepancy in capacitance with and without the image charge by using the same 100 samples. The discrepancy is larger at threshold voltage than at flat band (nearly 0 V). This means that the variation due to the location dependence of impurity ions is likely impactful on the threshold variation. This is the reason that the random dopant fluctuation occurs as threshold voltage variation.

Thus, we can find that the image charge modeling of the present disclosure is important to perform the highly reliable device simulation.

Figure 16:
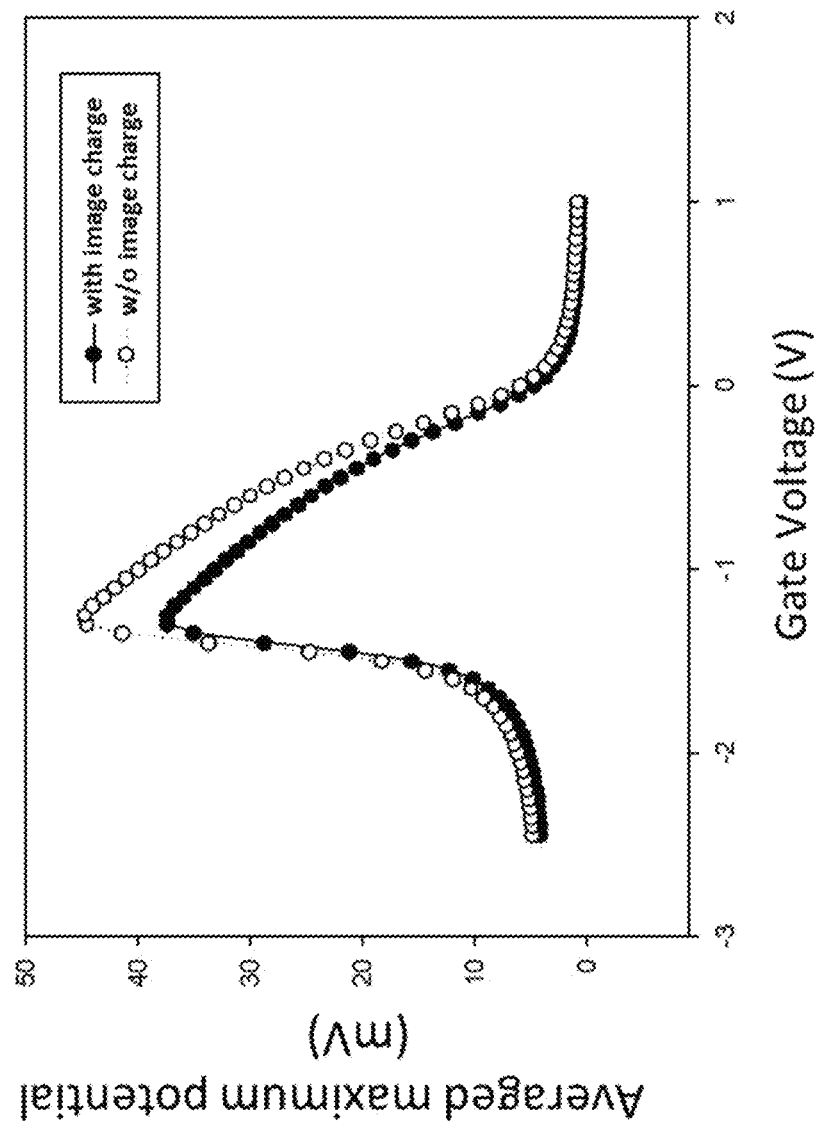
FIG. 16 is an illustration describing an example of the simulation result of the averaged maximum potential discrepancy.

Subsequently, let us discuss about the potential distribution. The potentials arrayed on lattice points throughout the continuous and discontinuous bodies in FIG. 2 is generally random due to the random dopant fluctuation. Accordingly, if we compare any two of impurity ion distributions of different samples, they may be different. In order to analyze the discrepancies of 100 samples in FIG. 13, we define the maximum potential discrepancy of each sample by the maximum of the discrepancies in the distributed potentials of each sample from those of the continuous body of FIG. 1 on the cross-section at Z=48 nm corresponding to FIGS. 10 and 11. In FIG. 16, we plot the averaged maximum potential discrepancies of these 100 samples with and without the image charge. Indeed, the discrepancy shows the maximum at near to threshold voltage with or without the image charge. In addition, the difference in the peak with and without the image charge is maximized at near to threshold voltage. This also shows that the location dependence of discrete impurity ions affects mainly on the variation of threshold voltage.

Figure 17:
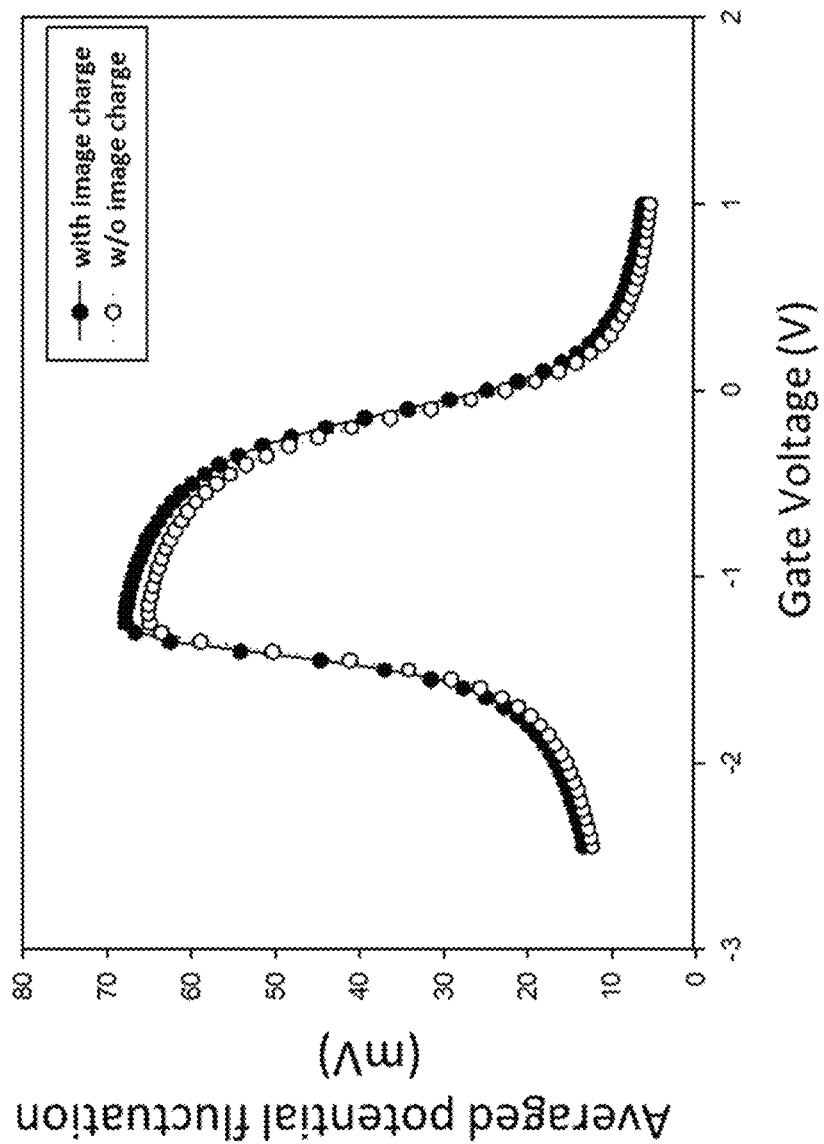
FIG. 17 is an illustration describing an example of the simulation result of the averaged potential fluctuation.

Next, we can define the potential fluctuation by the discrepancy of the maximum and minimum in potentials distributed on the cross-section at Z=48 nm and then calculate it with and without an image charge. In FIG. 17, we plot the averaged potential fluctuation by using the same 100 samples with FIG. 13. It is shown that the averaged potential fluctuation gradually increases from −2.5 V and then abruptly increases near to threshold voltage (around −1.5 V). In the depletion region, it gradually decreases and then abruptly decreases near to the flat band (about 0 V). The difference with and without the image charge behaves in a similar way. This also shows that the location dependence of discrete impurity ions affects mainly on the variation of threshold voltage.

The effects of the disclosure are discussed below.

As mentioned above, in the present disclosure, we can provide the simulation method that is consistent to the drift-diffusion model by using an image charge. In addition, this method enables for the highly reliable analysis of the impact of the fluctuation of the location distribution of impurity ions even with a limited computational resource because the analytical formula can substantially reduce the computation by computer in the simulation. In other words, the analytical formula replaces a significant part of the computational load.

Here, the electron devices mentioned in the present disclosure is any of the general semiconductor devices which can be fabricated using any kind of semiconductor substrates of a single crystal semiconductor (silicon and so forth) or a compound semiconductor (SiC, GaN, GaAs and so forth) and are equipped with the functions of an amplifier, the function of switching by, or not by, using the amplifier function, the function of sensing to sense stored quantity of charge, the function of rectification, the function of charge storage, and so forth. Accordingly, said simulation sample must include at least a semiconductor.

By using the present disclosure, it becomes able to perform the highly reliable simulation of random dopant fluctuation at a lower cost and then contributes to the suppression of the development cost of electron devices.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A method for simulating an electrical characteristic of a charge inside a semiconductor, executed by a computer, comprising:
   generating a random dopant fluctuation model by applying current continuity equations having drift-diffusion terms and a Poisson equation connecting second order derivatives of a potential distribution to a charge distribution, wherein a charge density is composed of the movement of plural electrons and plural holes, which carry charge inside a semiconductor, and a distribution of plural impurity ions which are doped in said semiconductor, wherein said impurity ions probabilistically replace lattice atoms or positive or negative ions, which form a crystal structure of said semiconductor, and then distribute randomly inside said semiconductor; and
   in the random dopant fluctuation model,
   converting one impurity ion among said plural impurity ions to be continuous by a long wavelength approximation,
   converting a charge of said one impurity ion to be a long wavelength impurity charge density, which corresponds to said one impurity ion, by the long wavelength approximation,
   converting the distribution of said plural impurity ions' charge to be a continuous impurity charge density by said long wavelength approximation, wherein said impurity charge density is a summation of plural long wavelength impurity charge densities which respectively correspond to said plural impurity ions, wherein said long wavelength impurity charge density is composed of a first term and a second term, wherein the first term is composed of a first charge density component converted from a first potential distribution calculated without a screening effect and a second charge density component converted from a second potential distribution with said screening effect, wherein said second term includes an electrostatic effect of an image charge positioned inside a dielectric film facing said semiconductor, wherein said image charge corresponds to said one impurity ion, and
   performing a simulation with the computer by applying the generated random dopant fluctuation model to obtain a random dopant fluctuation with an electrical characteristic selected from at least one of a relationship in gate capacitance versus gate voltage, a relationship in potential profile versus gate voltage, a relationship in electric current versus gate voltage relationship, a threshold voltage fluctuation and a spatial distribution fluctuation of said impurity charge density.

2. The method of claim 1, wherein said first potential distribution corresponds to a component of potential distribution whose wavelength is longer than said screening length, wherein said second potential distribution corresponds to a component of potential distribution whose wavelength is shorter than said screening length.

3. The method of claim 1, wherein said semiconductor has a first permittivity, wherein said screening length is proportional to the square root of said first permittivity, is proportional to the square root of temperature energy, and is inversely proportional to the square root of said impurity charge density, wherein said temperature energy is a product of the Boltzmann constant and absolute temperature of said semiconductor.

4. The method of claim 1, wherein said first term is inversely proportional to the square of said screening length, inversely proportional to the distance from said one impurity ion, and exponentially decay with the characteristic length being said screening length.

5. The method of claim 1, wherein said dielectric film has a second permittivity, wherein said second term is inversely proportional to the square of said screening length, inversely proportional to the distance from said one image charge, and exponentially decay with the characteristic length being said screening length, proportional to said first permittivity, and inversely proportional to the sum of said first and said second permittivity.

6. The method of claim 1, wherein said long wavelength approximation is characterized by said screening length, includes physical phenomena with its characteristic length being shorter than said screening length into consideration by tuning variables in an analytical equation, apparently excludes said physical phenomena with its characteristic length being shorter than said screening length from said analytical equation, and leaves physical phenomena with its characteristic length being longer than said screening length in said analytical equation.

7. The method of claim 6, wherein one of said variables is mobility of conduction electron or holes in a semiconductor and others of said valuables are effective masses of conduction electrons or holes in said semiconductor.

\* \* \* \* \*